(12) United States Patent
Maeda

(10) Patent No.: US 7,714,959 B2
(45) Date of Patent: May 11, 2010

(54) LIQUID CRYSTAL PANEL AND PROJECTION LIQUID CRYSTAL DISPLAY APPARATUS HAVING PARTICULAR LIGHT-SHIELDING FILM

(75) Inventor: Kazuyuki Maeda, Kitawagoya (JP)

(73) Assignee: Epson Imaging Devices Corporation, Azumino-Shi (JP)

(*) Notice: Subject to any disclaimer, the term of this patent is extended or adjusted under 35 U.S.C. 154(b) by 305 days.

(21) Appl. No.: 12/010,834

(22) Filed: Jan. 30, 2008

(65) Prior Publication Data

US 2008/0192167 A1 Aug. 14, 2008

(30) Foreign Application Priority Data

Feb. 14, 2007 (JP) ............................. 2007-033851

(51) Int. Cl.
*G02F 1/1333* (2006.01)
*G02F 1/1343* (2006.01)
*G02F 1/1335* (2006.01)

(52) U.S. Cl. ........................... 349/110; 349/141; 349/5

(58) Field of Classification Search ................. 349/110, 349/141, 5
See application file for complete search history.

(56) References Cited

U.S. PATENT DOCUMENTS 5,870,160 A * 2/1999 Yanagawa et al. ........... 349/141
6,266,117 B1 * 7/2001 Yanagawa et al. ........... 349/141
6,562,645 B2   5/2003 Sung et al.
6,690,434 B1 * 2/2004 Yamazaki et al. ............ 349/42

FOREIGN PATENT DOCUMENTS

| JP | A 09-258203   | 10/1997 |
| JP | A-10-170958   | 6/1998  |
| JP | A-11-119210   | 4/1999  |
| JP | A-2002-90781  | 3/2002  |
| JP | A-2005-55814  | 3/2005  |
| KR | 10-2005-0067748 | 7/2005 |

* cited by examiner

*Primary Examiner*—Mike Qi
(74) *Attorney, Agent, or Firm*—Oliff & Berridge, PLC

(57) ABSTRACT

A liquid crystal panel includes a first substrate having pixels defining a pixel region, and pixel electrodes and a common electrode disposed in the pixel region on the first substrate. The pixel electrodes are disposed for the respective pixels. The liquid crystal panel also includes a second substrate opposing the first substrate and a light-shielding film disposed on the second substrate. The light-shielding film includes a frame portion surrounding the pixel region and a middle portion disposed at least in the pixel region. The middle portion is made of a material having a higher specific resistance than the frame portion. The frame portion is made of a material having a higher light-shielding property than the middle portion.

7 Claims, 9 Drawing Sheets

LIQUID CRYSTAL PANEL AND PROJECTION LIQUID CRYSTAL DISPLAY APPARATUS HAVING PARTICULAR LIGHT-SHIELDING FILM

BACKGROUND

1. Technical Field

The present invention relates to liquid crystal panels and projection liquid crystal display apparatuses, and particularly to a liquid crystal panel including a resin light-shielding film and a projection liquid crystal display apparatus using the liquid crystal pane.

2. Related Art

A twisted nematic (TN) or electrically controlled birefringence (ECB) liquid crystal panel has pixel electrodes and a common electrode that are disposed on their respective substrates. On the other hand, a fringe field switching (FFS) or in-plane switching (IPS) liquid crystal panel has pixel electrodes and a common electrode that are disposed on the same substrate.

In the TN type, a chromium (Cr) light-shielding film is generally formed as a black matrix on the substrate having the common electrode. Since chromium has a high light reflectance, the light-shielding film may be made of a composite including a chromium layer and a low-reflectance chromium oxide layer. In the FFS type, the light-shielding film is formed of a resin on the substrate having no electrode. This is because a metal layer of the substrate opposing the pixel electrodes and the common electrode with the liquid crystal layer therebetween, or electrification causes an electric field generated from this opposing substrate to affect the electric field between the pixel electrodes and the common electrode, thereby degrading the display quality.

The above-mentioned chromium light-shielding film and resin light-shielding film are disclosed in Japanese Unexamined Patent Application Publication No. 9-258203.

Resins used for the light-shielding film have optical densities (OD) in the range of, for example, 3.0 to 4.0, and the OD values of resins are generally lower than those of chromium and chromium oxide. Chromium and chromium oxide can have OD values of, for example, 4.0 to 4.5. Therefore, the resin light-shielding film is liable to cause light leakage in comparison with the chromium light-shielding film. Light leakage tends to be conspicuous when a high-intensity backlight is used.

In general, organic resins have lower adhesion to glass, which is an inorganic material, than chromium and chromium oxide. Accordingly, the resin light-shielding film is liable to separate from the substrate. If the light-shielding film separates, moisture enters the liquid crystal panel through an edge of the panel to degrade the reliability.

If the resin light-shielding film is formed using a resist film, the above problems are liable to occur because of the low OD value and adhesion.

SUMMARY

An advantage of some aspect of the invention is that it provides a liquid crystal panel including a resin light-shielding film in which the problems resulting from the use of the resin light-shielding film are reduced, and a projection liquid crystal display apparatus using the liquid crystal panel.

According to an aspect of the invention, a liquid crystal panel is provided which includes a first substrate having pixels defining a pixel region, and pixel electrodes and a common electrode disposed in the pixel region on the first substrate. The pixel electrodes are disposed for the respective pixels. The liquid crystal panel also includes a second substrate opposing the first substrate and a light-shielding film disposed on the second substrate. The light-shielding film includes a frame portion surrounding the pixel region and a middle portion disposed at least in the pixel region. The middle portion is made of a material having a higher specific resistance than the frame portion. The frame portion is made of a material having a higher light-shielding property than the middle portion. In the liquid crystal panel, the middle portion of the light-shielding film prevents electrification, and the frame portion prevents light leakage. Thus, problems with displaying images resulting from electrification and light leakage can be reduced simultaneously.

Preferably, the frame portion and the second substrate are made of an inorganic material and are in contact with each other. Thus, the frame portion of the light-shielding film and the second substrate produces a high adhesion therebetween. Consequently, the frame portion can be prevented from separating from the substrate, thereby preventing moisture from entering the panel. Thus, the reliability of the liquid crystal panel can be enhanced.

Preferably, the frame portion is disposed at least a distance equivalent to one pixel away from the outermost pixels. The interval between the frame portion of the light-shielding film and the outermost pixels prevents the problem with displaying images resulting from electrification even if the frame portion is electrified. In addition, the interval equivalent to one pixel suppresses light leakage from the region outside the pixel region. Consequently, the liquid crystal panel can produce high quality images.

Preferably, the frame portion is made of a material having a higher thermal conductivity than the middle portion. Thus, the frame portion dissipates heat to prevent the temperature of the liquid crystal layer from increasing even if the temperature of the middle portion is increased. Consequently, the liquid crystal panel can produce high quality images.

According to another aspect of the invention, a projection liquid crystal display apparatus is provided which includes the above-described liquid crystal panel and a light source that irradiates the liquid crystal panel. The light source of a projection liquid crystal display apparatus is generally has a higher intensity than the light source of a direct-view liquid crystal display apparatus. Accordingly, the liquid crystal display apparatus according to the aspect can reduce light leakage more effectively in a projection type than in a direct-view type.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
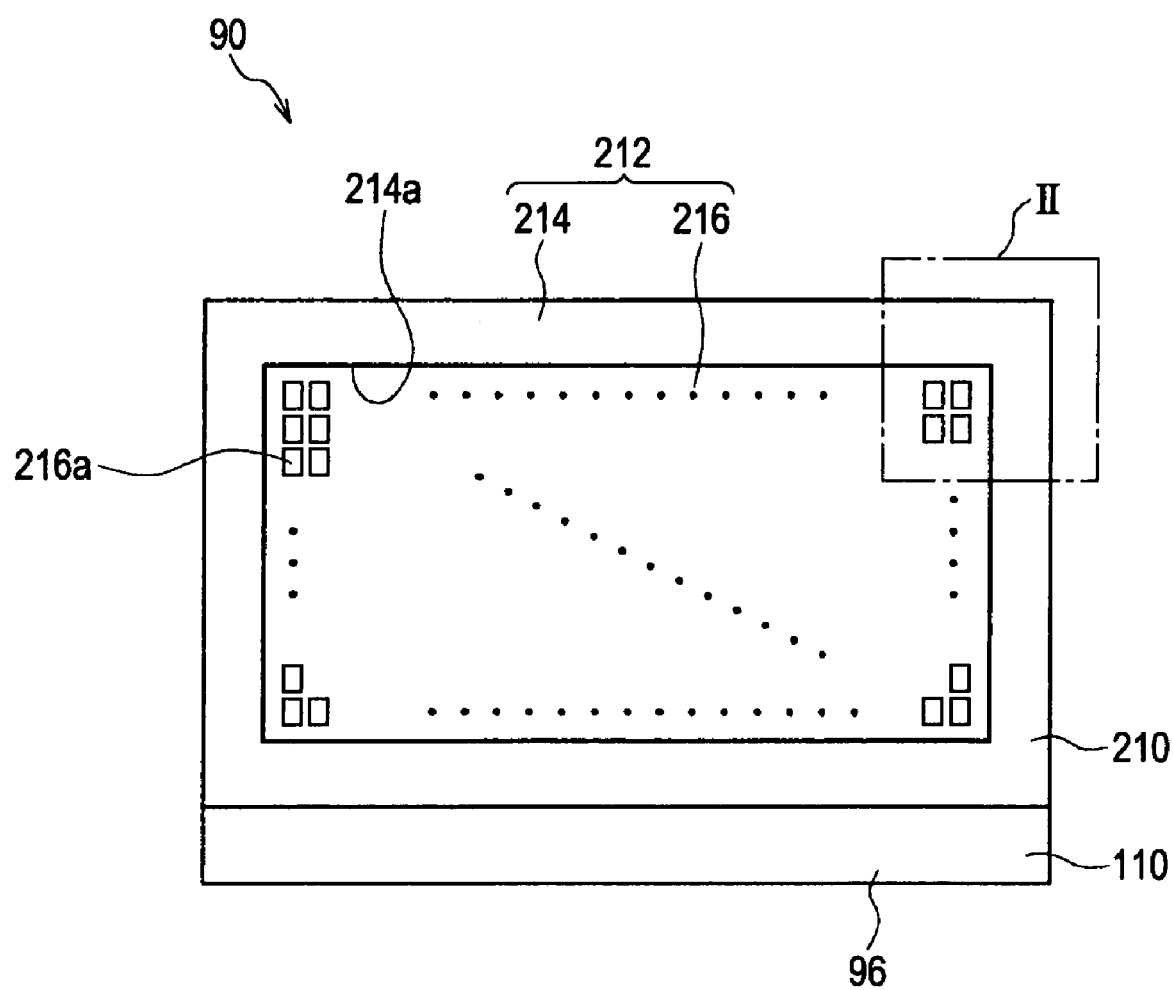
FIG. 1 is a plan view of a liquid crystal panel according to an embodiment of the invention.
Figure 2:
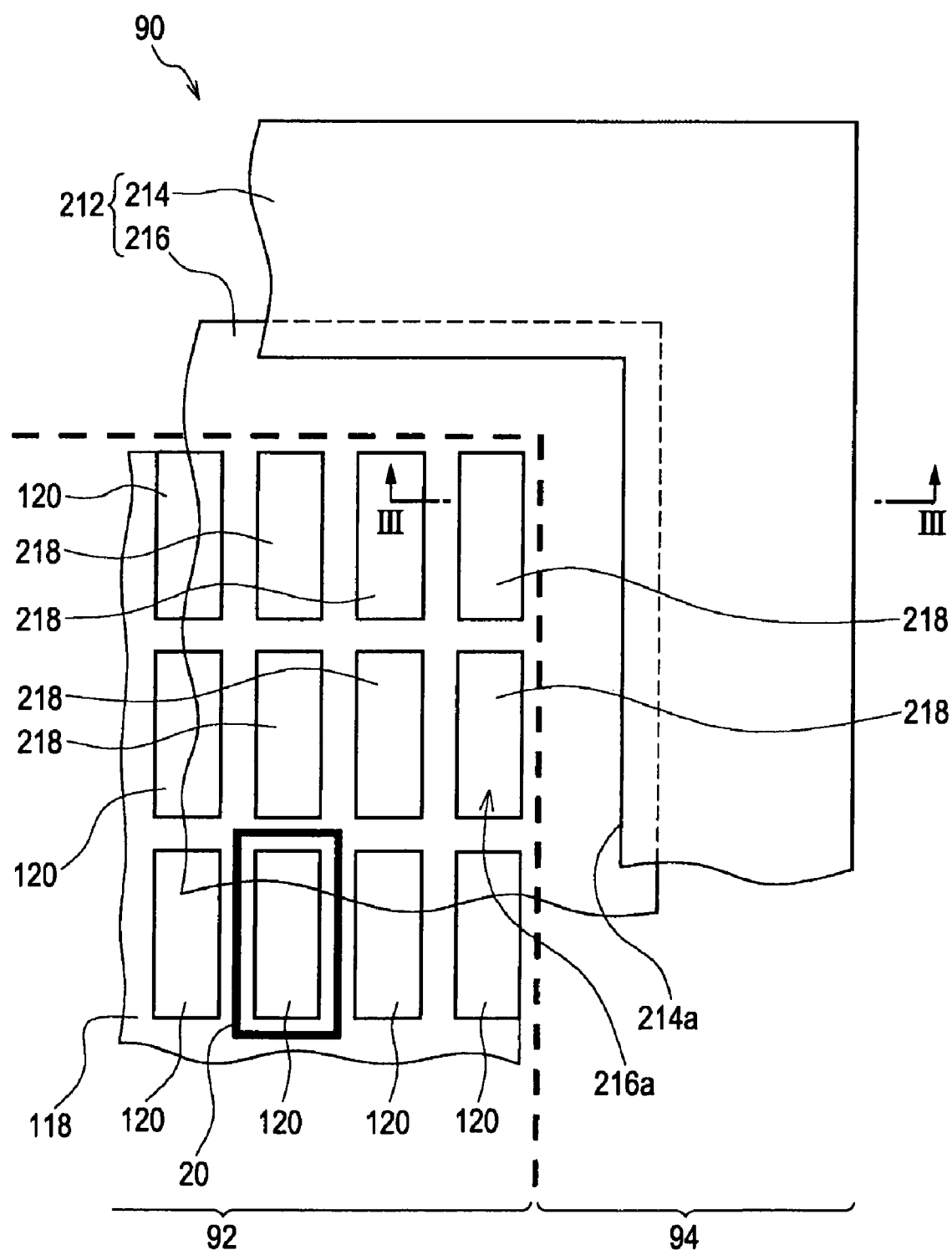
FIG. 2 is an enlarged view of the portion surrounded by dotted chain line II in FIG. 1.
Figure 3:
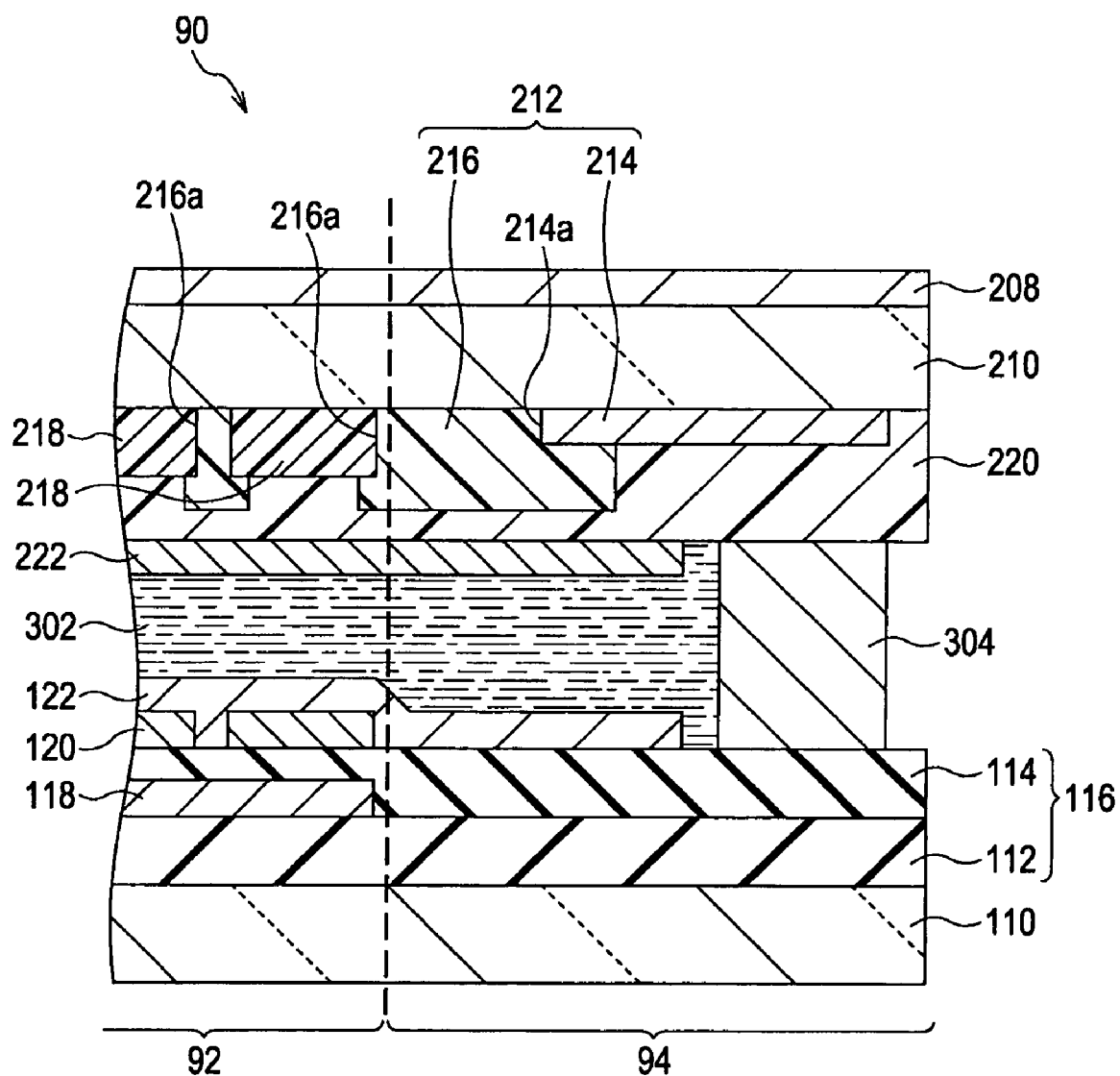
FIG. 3 is a sectional view of the portion shown in FIG. 2 taken along line III-III.

FIG. 1 shows a plan view of a liquid crystal panel 90 according to an embodiment of the invention, and FIG. 2 shows an enlarged view of the portion surrounded by dotted chain line II in FIG. 1. FIG. 3 is a sectional view of the portion shown in FIG. 2 taken along line III-III. Some of the parts shown in FIG. 3 are omitted in FIGS. 1 and 2.

The liquid crystal panel 90 has a pixel region 92 where a plurality of pixels 20 are arranged. For the sake of easy understanding, one of the pixels 20 is designated by a bold line in FIG. 2. While FIG. 2 shows pixels 20 arranged in a matrix manner, the pixels 20 may be arranged in a delta form. At least the outermost pixels 20 may be used as dummies that do not directly contribute to displaying images.

The region of the liquid crystal panel 90 outside the pixel region 92 is referred to as the surrounding region 94.

The liquid crystal panel 90 includes a first optically transparent substrate 110 and a second optically transparent substrate 210 that have various components, a liquid crystal layer 302, and a seal 304, as shown in FIG. 3. The first and second optically transparent substrates 110 and 210 may be made of, for example, glass. The first and second optically transparent substrates 110 and 210 having the components are bonded to each other with the seal 304 at the edges of the substrates so as to oppose each other. The liquid crystal layer 302 is disposed between the optically transparent substrates 110 and 210.

Insulating layers 112 and 114, a common electrode 118, pixel electrodes 120, and an alignment layer 122 are disposed on the liquid crystal layer 302 side, or the inner surface, of the first optically transparent substrate 110 so as to oppose the liquid crystal layer 302.

In the liquid crystal panel 90, which is of an FFS type, both electrodes 118 and 120 are disposed on the first optically transparent substrate 110. The electrodes 118 and 120 may be made of an optically transparent electroconductive film, such as an ITO (indium tin oxide) film. The electrodes 118 and 120 are formed one on top of the other with the insulating layer 114 therebetween. In the present embodiment, the pixel electrodes 120 are disposed over the common electrode 118, that is, the pixel electrodes 120 are located closer to the liquid crystal layer 302 than the common electrode 118. However, the common electrode 118 may be disposed over the pixel electrodes 120. The pixel electrode 120 in the embodiment, that is, one electrode disposed above the other electrode, is formed in a line-and-space pattern with slits (not shown). An electric field is generated between the electrodes 118 and 120, and the electric field controls the orientation of the liquid crystal molecules of the liquid crystal layer 302 through the slits to drive the liquid crystal (molecules).

The common electrode 118 and the pixel electrodes 120 define electrode pairs in the respective pixels 20 and generate the liquid crystal-driving electric field in the pixels 20. The pixel electrodes 120 are disposed in the respective pixels 20, and each has a potential according to the image of the corresponding pixel 20. The common electrode 118 has a potential common to all the pixels 20.

FIGS. 2 and 3 show a structure having a common electrode 118 defined by a continuous single electrode layer spread across all the pixels 20. However, a plurality of common electrodes 118 may be formed for the respective pixels 20 and the common electrodes 118 may be connected with wires. The pixels 20 may be divided into several groups and the common electrode 118 may be provided for each group.

The insulating layers 112 and 114 may be formed of, for example, silicon oxide or silicon nitride on the first optically transparent substrate 110. For the sake of ease of description, in the present embodiment, the insulating layer underlying the common electrode 118, that is, the insulating layer closer to the first optically transparent substrate 110 is designated by reference numeral 112, and the insulating layer designated by reference numeral 114 is formed on that insulating layer 112. These insulating layers 112 and 114 are referred to as the insulating layer 116 as a whole. The insulating layers 112 and 114 may each be defined by a single layer or a multilayer.

In the FFS type, the pixel electrodes 120 and the common electrode 118 oppose each other not only at the slit portions of the line-and-space pattern, but also at the line portions of the pattern, thus defining hold capacitors with the insulating layer 114 therebetween.

The alignment layer 122 covers the pixel electrodes 120 on the insulating layer 114. The surface in contact with the liquid crystal layer 302 of the alignment layer 122 is rubbed in the direction substantially parallel to the direction in which the slits extend.

A polarizer (not shown) is disposed at the outer surface of the first optically transparent substrate 110 opposite to the liquid crystal layer 302.

A light-shielding film 212, color filters 218, an overcoat layer 220, and an alignment layer 222 are formed so as to oppose the liquid crystal layer 302 on the inner surface, that is, on the surface on the liquid crystal layer 302 side, of the second optically transparent substrate 210.

The light-shielding film 212 spreads over the entire inner surface of the second optically transparent substrate 210 and has holes 216a in the positions opposing the pixels 20. The portions opposing the dummy pixels may not have the holes 216a. The light-shielding film 212 includes a frame portion 214 and a middle portion 216. The frame portion 214 is disposed in the surrounding region 94 and defines a frame surrounding the pixel region 92. The middle portion 216 continues from the inner edge of the frame portion 214 and thus disposed in the opening 214a of the frame portion 214. The middle portion 216 spread over in the pixel region 92, and the holes 216a opposing the pixels 20 are formed in the middle portion 216. The light-shielding film 212 will further be described later.

Color filters 218 are disposed so as to oppose the common electrode 118 and the pixel electrodes 120, on the inner surface of the second optically transparent substrate 210 in the holes 216a of the light-shielding film 212. The color filters 218 may be made of a resin colored, for example, blue and have a thickness of, for example, 1 to 2 μm.

The overcoat layer 220 disposed closer to the liquid crystal layer 302 than the light-shielding film 212 and the color filters 218 to cover the entire surfaces of the light-shielding film 212 and the color filters 218. The overcoat layer 220 has a flat surface at the liquid crystal layer 302 side so as to planarize the unevenness formed by the light-shielding film 212 and the color filters 218. The overcoat layer 220 may be made of an acrylic resin.

The alignment layer 222 is formed on the flat surface of the overcoat layer 220. The surface in contact with the liquid crystal layer 302 of the alignment layer 222 is rubbed in a predetermined direction.

An optically transparent electroconductive film 208 and a polarizer (not shown) are provided on the surface opposite to the liquid crystal layer 302, that is, the outer surface, of the second optically transparent substrate 210. While FIG. 3 shows the optically transparent electroconductive film 208 in contact with the second optically transparent substrate 210, the polarizer may be disposed between the second optically transparent substrate 210 and the optically transparent electroconductive film 208. In addition to or instead of the polarizer, a retardation film, an optical compensation plate, a brightness enhancement film, an anti-reflection film, or any other optical film may be provided between the optically transparent electroconductive film 208 and the second optically transparent substrate 210.

The optically transparent electroconductive film 208 is held, at a predetermined potential, for example, at a grounding potential, during, at least, the operation of the liquid crystal panel 90. For setting at a grounding potential, for example, an external circuit can be used. Thus, static electricity coming into the optically transparent substrate 210 from the outside of the panel can be dissipated to prevent the second optically transparent substrate 210 from being electrified. Hence, the optically transparent electroconductive film 208 serves as a shield layer, thus preventing problems with displaying images resulting from the electrification of the second optically transparent substrate 210, such as contrast degradation and non-uniformity of displayed images.

The optically transparent electroconductive film 208 may be made of, for example, ITO, and may be made of an inorganic material or an organic material. The optically transparent electroconductive film 208 has a resistivity (sheet resistance) of, for example, $10^5$ ohm/square, and the lower the better. The optically transparent electroconductive film 208 may not be patterned to form gaps, or may be patterned into a mesh as long as it can shield the panel from static electricity.

The light-shielding film 212 includes the frame portion 214 and the middle portion 216, as described above. The frame portion 214 is disposed in the surrounding region 94 and surrounds the pixel region 92. The middle portion 216 continues from the inner edge of the frame portion 214 to spread over in the pixel region 92. The inner edge of the frame portion 214 overlaps with the outer edge of the middle portion 216, thus preventing a gap from being formed between the frame portion 214 and the middle portion 216. These two portions are in contact with each other at the overlap.

The frame portion 214 is disposed away from the outermost pixel electrodes 120, which will be described later. Accordingly, the middle portion 216 spreads beyond the pixel region 92. For example, the middle portion 216 spreads over the pixel region 92 and further a width of about 500 μm.

The middle portion 216 is made of a material having a higher specific resistance than the frame portion 214, and the frame portion 214 is made of a material having a higher light-shielding property than the middle portion 216. For example, the middle portion 216 can be made of a resin containing a black pigment, and the frame portion 214 can be made of chromium (Cr), chromium oxide, or a composite including a chromium layer and a chromium oxide layer. In such a case, the frame portion 214 has a thickness of, for example, 160 nm (1600 Å), and the middle portion 216 has a thickness of, for example, about 1 to 2 μm. In general, resins have higher specific resistances than those of chromium and chromium oxide, and the specific resistance of the resin portion can be adjusted by selecting the resin material. Chromium and chromium oxide have optical densities (OD) in the range of, for example, 4.0 to 4.5. Resins generally used for the light-shielding film of a liquid crystal panel have OD values in the range of, for example, 3.0 to 4.0.

In the type of liquid crystal display apparatus whose liquid crystal panel 90 is directly viewed, the frame portion 214 is preferably made of chromium oxide or the above-described composite, which have higher reflectances than chromium, from the viewpoint of enhancing the visibility (display property). On the other hand, in projection liquid crystal display apparatuses, the material of the frame portion 214 can be selected from a wide range since the user does not directly view the liquid crystal panel 90.

Since the middle portion 216 has a higher specific resistance than the frame portion 214, the middle portion 216 is not easy to electrify. Accordingly, the electric field between the electrodes 118 and 120 can be prevented from being affected by the electrification, and thus, problems resulting from the electrification, such as contrast degradation and non-uniformity of displayed images, can be reduced. In addition, since the frame portion 214 has a higher light-shielding property than the middle portion 216, light leakage from the frame portion 214, or light leakage from the surrounding region 94, can be suppressed in comparison with the structure in which the entire light-shielding film is made of a resin. Thus, problems resulting from light leakage, such as contrast degradation, can be reduced. The light-shielding film 212 thus prevents problems resulting from light leakage, as well as problems resulting from electrification.

The edge of the frame portion 214 defining the opening 214a is away from the outermost pixel electrodes 120. In the present embodiment, the interval between the frame portion 214 and the outermost pixel electrodes 120 is equivalent to a size of one pixel 20, for example, 50 μm. In this instance, if the pixels 20 are rectangular, the size equivalent to one pixel is, for example, between the width and the length of the pixel.

The frame portion 214 is more easily electrified than the middle portion 216 because of its lower specific resistance than the middle portion 216. Consequently, the electric field between the electrodes 118 and 120 may be affected by the electrification of the frame portion 214 at a region close to the frame portion 214. However, the frame portion 214 is disposed away from the outermost pixel electrodes 120, and thus the problems with displaying images resulting from the electrification can be reduced. In order to alleviate the influence of the electrification, the wider the interval between the frame portion 214 and the outermost pixel electrodes 120, the better it is. However, if the interval is extended, the middle portion 216, which has a lower light-shielding property, occupies a larger area in the surrounding region 94. Therefore, an interval of a size equivalent to one pixel can prevent problems with displaying images resulting from electrification, and light leakage from the surrounding region 94. Consequently, the liquid crystal panel 90 of the present embodiment can produce high quality images.

The frame portion 214 and the second optically transparent substrate 210, which are in contact with each other, are made of inorganic materials. Consequently, the frame portion 214 has a high adhesion to the second optically transparent substrate 210, thus being difficult to separate from the substrate. The difficulty of separation of the frame portion 214, which is disposed close to the edge of the substrate, is effective in preventing moisture from entering the panel. Thus, the reliability of the liquid crystal panel 90 can be enhanced.

The middle portion 216 is in contact with the frame portion 214. Since chromium and chromium oxide generally have higher thermal conductivities than resins, the frame portion 214 has a higher thermal conductivity than the middle portion 216. Accordingly, even if the temperature of the middle portion 216 is increased by, for example, the heat of the backlight, the frame portion 214 dissipates the heat. Thus, the liquid crystal layer 302 can be prevented from being heated. Consequently, the liquid crystal panel 90 can produce high quality images.

The liquid crystal panel 90 can be applied to both the direct-view liquid crystal display apparatus and the projection liquid crystal display apparatus. A projection liquid crystal display apparatus including the liquid crystal panel 90 will now be described.

Figure 4:
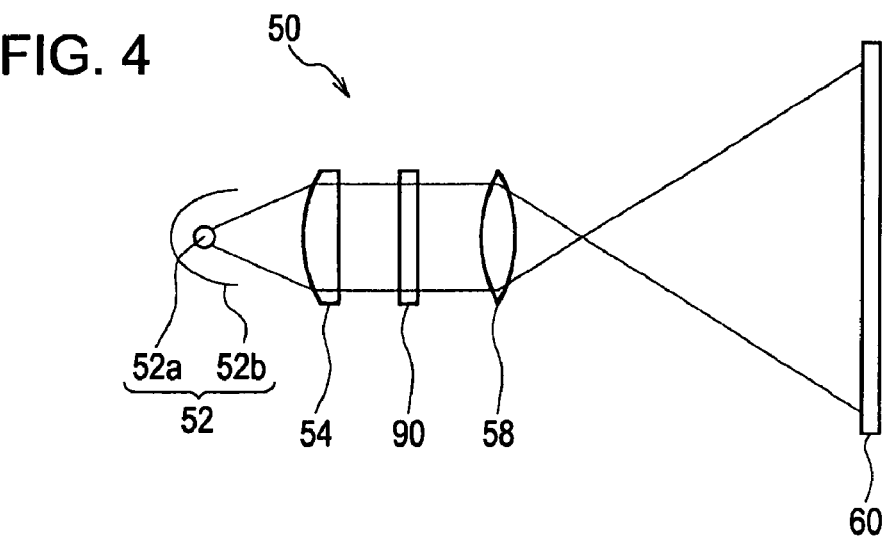
FIG. 4 is a schematic view of the structure of a projection liquid crystal display apparatus according to an embodiment of the invention.

FIG. 4 shows a schematic view of the structure of a projection liquid crystal display apparatus 50 according to an embodiment of the invention. In addition to the liquid crystal panel 90, the projection liquid crystal display apparatus 50 includes a light source 52, a condensing lens 54, and a projector lens 58. The liquid crystal display apparatus 50 may also include other components, such as optical devices, but such components are not described herein for the sake of simplification.

The liquid crystal display apparatus 50 is a so-called single panel type. For displaying color images, the liquid crystal panel 90 includes, for example, red (R), green (G), and blue (B) color filters 218 (see FIG. 3).

The light source 52 includes, for example, a lamp 52a and a reflector 52b. The lamp 52a may be a high intensity lamp, such as a metal halide lamp, a xenon lamp, or a halogen lamp. The light source 52 is disposed so that the liquid crystal panel 90 is irradiated with the light emitted from the light source 52. While FIG. 4 shows a structure in which the light source 52 and the liquid crystal panel 90 are disposed so as to be on a line, a mirror may be used to direct the emitted light from the light source 52 to the liquid crystal panel 90.

The emitted light from the light source 52 is conducted to the projector lens 58 through the condensing lens 54 and the liquid crystal panel 90, and is enlarged and projected onto a screen 60 by the projector lens 58.

The liquid crystal display apparatus 50 may be a front type or a rear type. In the front type, the user views projection images on the screen 60 from the projector lens 58 side. In the rear type, the user views the images through the screen 60, and the rear type liquid crystal display device 50 includes the screen 60.

Figure 5:
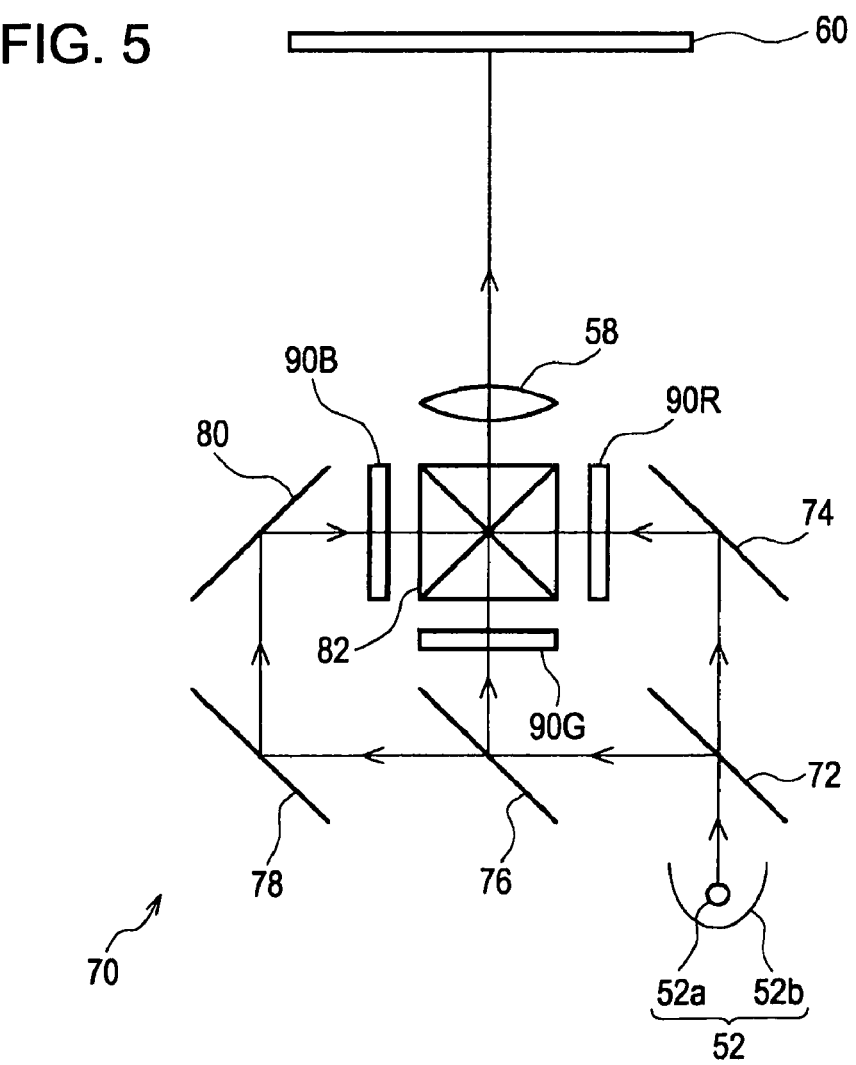
FIG. 5 is a schematic view of the structure of a projection liquid crystal display apparatus according to another embodiment of the invention.

FIG. 5 shows a schematic view of the structure of a projection liquid crystal display apparatus 70 according to another embodiment of the invention. The projection liquid crystal display apparatus 70 is a so-called three-panel color display device, and includes three liquid crystal panels 90 (designated by reference numerals 90R, 90G, and 90B respectively for the sake of ease of description). In addition to these liquid crystal panels 90R, 90G, and 90B, the projection liquid crystal display apparatus 70 includes a light source 52, dichroic mirrors 72 and 76, total reflection mirrors 74, 78, and 80, a dichroic prism 82, and a projector lens 58. For the sake of ease of description, other components that may be included in the liquid crystal display apparatus 70 will not be described.

The emitted light from the light source 52 is conducted to the dichroic mirror 72. Red light produced by passing through the dichroic mirror 72 is reflected from the total reflection mirror 74 and thus conducted to the liquid crystal panel 90R. The light reflected from the dichroic mirror 72 is conducted to another dichroic mirror 76. Green light produced by reflecting from this dichroic mirror 76 is conducted to the liquid crystal panel 90G. Blue light produced by passing through the dichroic mirror 76 is reflected from the total reflection mirrors 78 and 80 and is thus conducted to the liquid crystal panel 90B. These color light components are conducted to the dichroic prism 82 through the respective liquid crystal panels 90R, 90G, and 90B and synthesized. The synthesized light is conducted to the projector lens 58, and is enlarged and projected onto a screen 60 by the projector lens 58. The three-panel liquid crystal display apparatus 70 may also be a front type or a rear type.

In this liquid crystal display apparatus 70, the light emitted from the light source 52 is split into red, green, and blue light components. Therefore, the liquid crystal panels 90R, 90G, and 90B do not necessarily have color filters 218. On the other hand, the liquid crystal panels 90R, 90G, and 90B may have color filters 218. In this instance, the color filters 218 may control the hues of the three colors.

While the liquid crystal display apparatus 70 of the embodiment splits the light emitted from the light source 52, the liquid crystal display apparatus 70 may be modified to a structure in which the liquid crystal panels 90R, 90G, and 90B color-modulate the light from the light source 52. In this instance, the color filters 218 of the liquid crystal panel 90R are intended for red color; the color filters 218 of the liquid crystal panel 90G are intended for green color; and the color filters 218 of the liquid crystal panel 90B are intended for blue color.

The projection liquid crystal display apparatuses 50 and 70 can be used for displaying TV broadcast images and recorded video images. Also, the projection liquid crystal display apparatuses 50 and 70 can be used as vehicle-mounted head-up displays (HUD). In this instance, for example, the front glass of the vehicle can be used as the screen 60. A projection liquid crystal display apparatus may include a reflective liquid crystal panel as a reflective optical system. In this instance, one of the substrates of the liquid crystal panel is not necessarily optically transparent.

In general, projection liquid crystal display apparatuses use a more high-intensity light source than direct-view liquid crystal display apparatuses. By using the liquid crystal panel 90 including the light-shielding film 212 in projection liquid crystal display apparatuses, light leakage can be prevented more effectively than in use in direct-view liquid crystal display apparatuses. Thus, the liquid crystal panel 90 is more suitable for projection liquid crystal display apparatuses.

Figure 6:
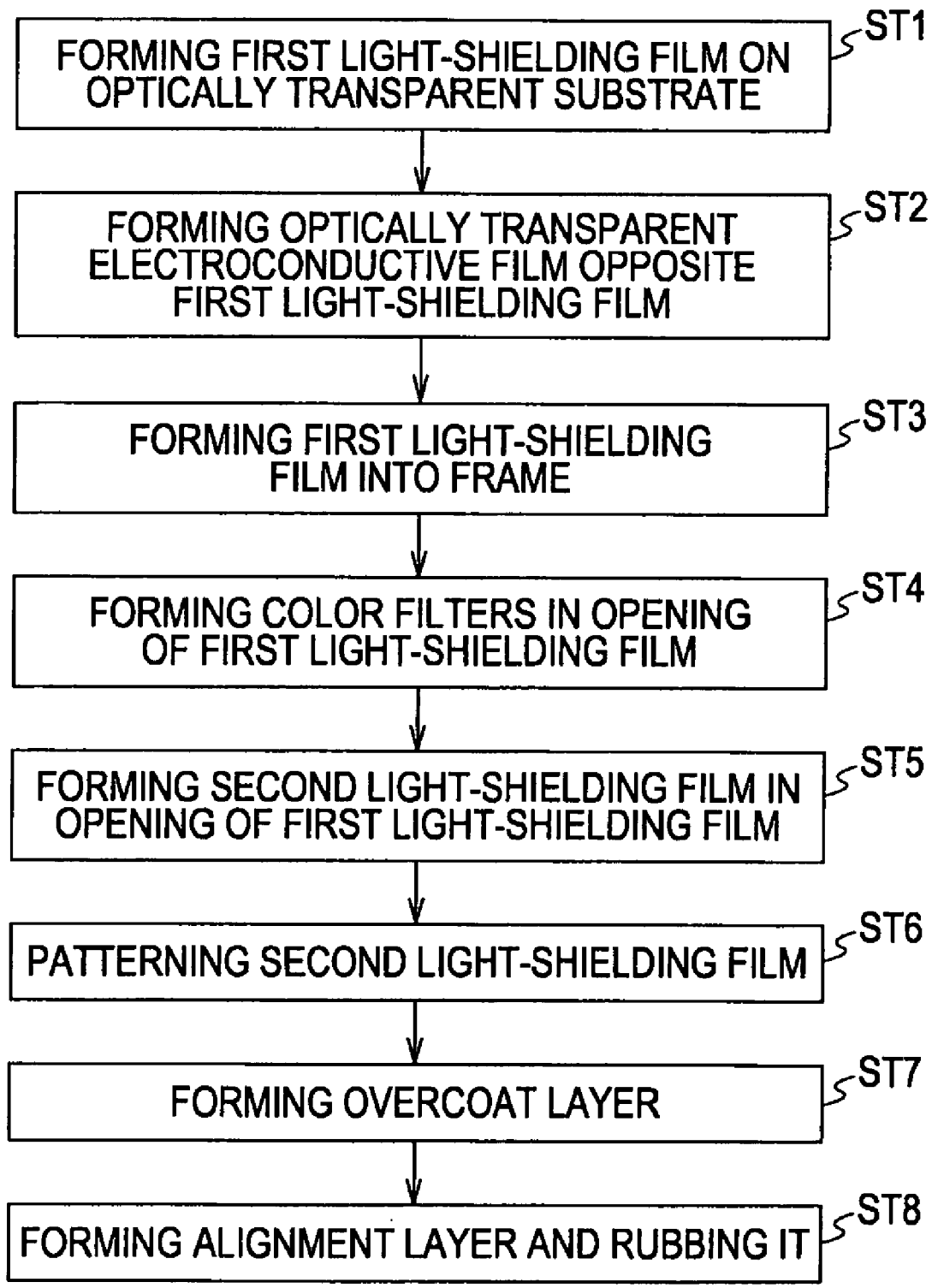
FIG. 6 is a flow diagram of a process for manufacturing a liquid crystal panel according to an embodiment.

FIG. 6 is a flow diagram of a process for manufacturing the liquid crystal panel 90, particularly for preparing the structure of the second optically transparent substrate 210 side. FIGS. 7 and 9 to 13 are sectional views of structures in the process, and FIG. 8 is a plan view of a structure in the process. The process includes Steps ST1 to ST8.

Figure 7:
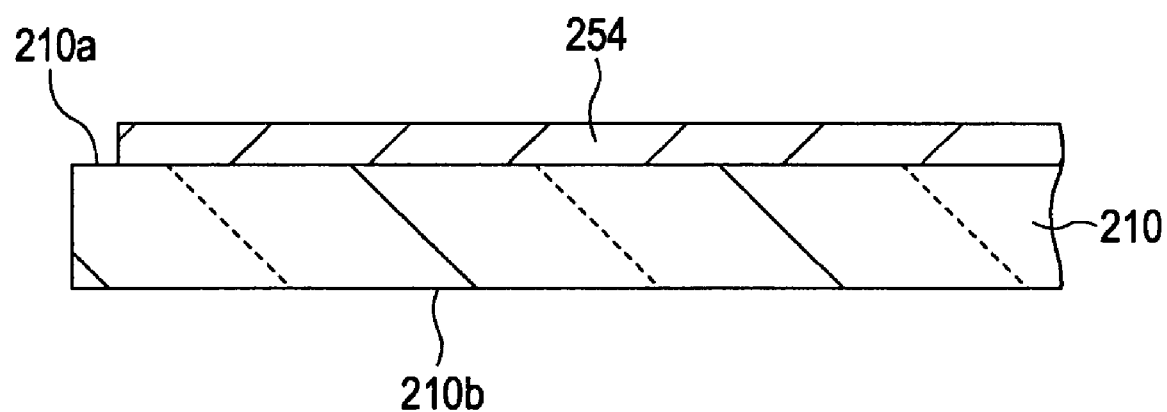
FIG. 7 is a sectional view of a structure in the process for manufacturing the liquid crystal panel.
Figure 8:
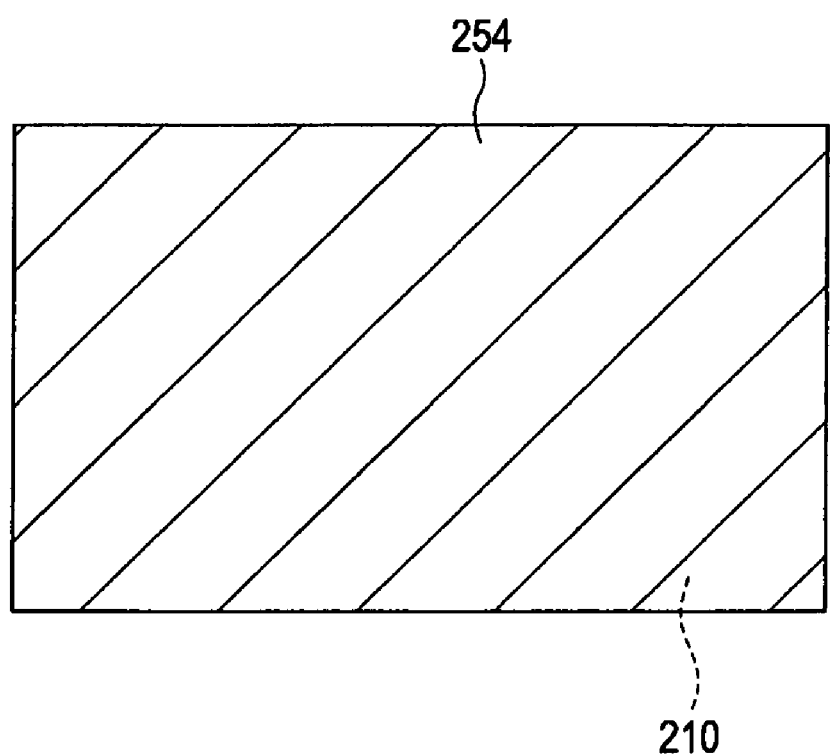
FIG. 8 is a plan view of a structure in the process for manufacturing the liquid crystal panel.

Step ST1 forms a first light-shielding film 254 on a first surface 210a of the second optically transparent substrate 210, as shown in FIGS. 7 and 8. The first light-shielding film 254 is intended to be the frame portion 214 of the light-shielding film 212 (see FIGS. 1 to 3), and can be formed of chromium or the like by, for example, sputtering. The first light-shielding film 254 is formed over the entire first surface 210a, that is, over the pixel region 92 and the surrounding region 94 (see FIGS. 1 to 3) without gaps.

Figure 9:
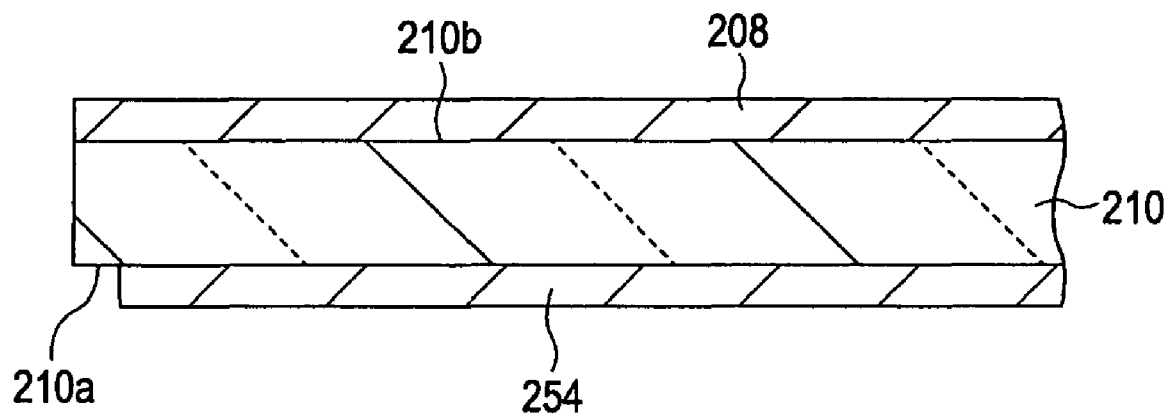
FIG. 9 is a sectional view of a structure in the process for manufacturing the liquid crystal panel.

Step ST2 forms an optically transparent electroconductive film 208 on a second surface 210b of the second optically transparent substrate 210, as shown in FIG. 9. The first surface 210a and the second surface 210b are opposing surfaces of the second optically transparent substrate 210, and one serves as the front surface while the other serves as the rear surface. The optically transparent electroconductive film 208 can be formed of ITO or the like by, for example, sputtering.

Figure 10:
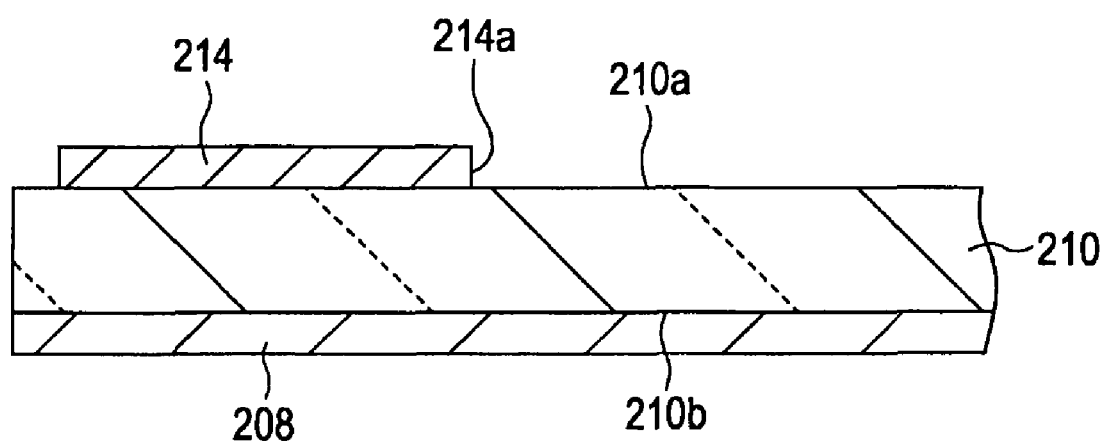
FIG. 10 is a sectional view of a structure in the process for manufacturing the liquid crystal panel.

Step ST3 patterns the first light-shielding film 254 into a frame surrounding the pixel region 92 by forming an opening in the first light-shielding film 254, thus forming a frame portion 214, as shown in FIG. 10. The patterning for forming the opening can be performed by wet-etching. For example, the chromium light-shielding film 254 can be wet-etched with a mixed acid of nitric acid ($HNO_3$) and cerium (IV) diammonium nitrate ($Ce(NH_4)_2(NO_3)_6$). In Step ST3, the optically transparent electroconductive film 208 may be etched together with the first light-shielding film 254. Accordingly, it is preferable that in Step ST2, the optically transparent electroconductive film 208 be formed to a thickness larger than the intended thickness by a thickness reduced in Step ST3. For example, the optically transparent electroconductive film 208 is formed to a thickness about 20 to 60 nm larger than the intended thickness. Thus, the optically transparent electroconductive film 208 is prevented from being completely removed in Step ST3. The thickness to be reduced can be experimentally known in advance.

Figure 11:
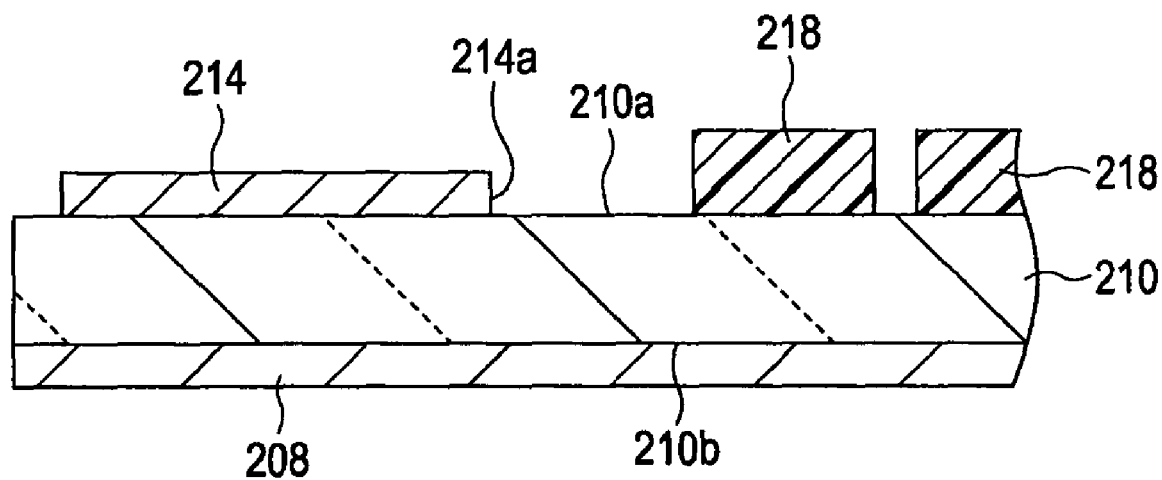
FIG. 11 is a sectional view of a structure in the process for manufacturing the liquid crystal panel.

Step ST4 forms color filters 218 on the first surface 210a exposed in the opening 214a of the frame portion 214 formed in Step ST3, as shown in FIG. 11. The color filters 218 can be formed by a variety of methods. For example, the color filters 218 can be formed by patterning a resist film, a liquid of a color filter material, or the like disposed on the exposed surface 210a. If the color filters 218 are used for a plurality of colors, color filters 218 can be formed for each color from one color to another.

Figure 12:
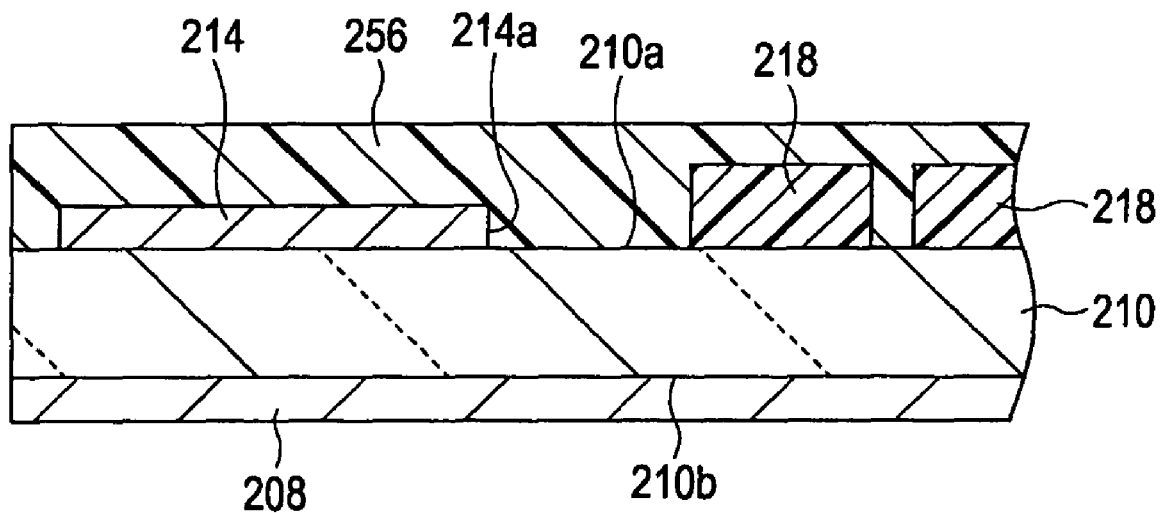
FIG. 12 is a sectional view of a structure in the process for manufacturing the liquid crystal panel.

Step ST5 forms a second light-shielding film 256 to cover the opening 214a of the frame portion 214, as shown in FIG. 12. FIG. 12 shows an example in which the second light-shielding film 256 is formed not only in the opening 214a, but also over the entire first surface 210a of the substrate 210 including the frame portion 214 and the color filters 218. The second light-shielding film 256 is intend to be the middle portion 216 of the light-shielding film 212 (see FIG. 1 to 3), and is formed of, for example, a resin. The resin second light-shielding film 256 can be formed by using a resist film or a resin liquid.

Figure 13:
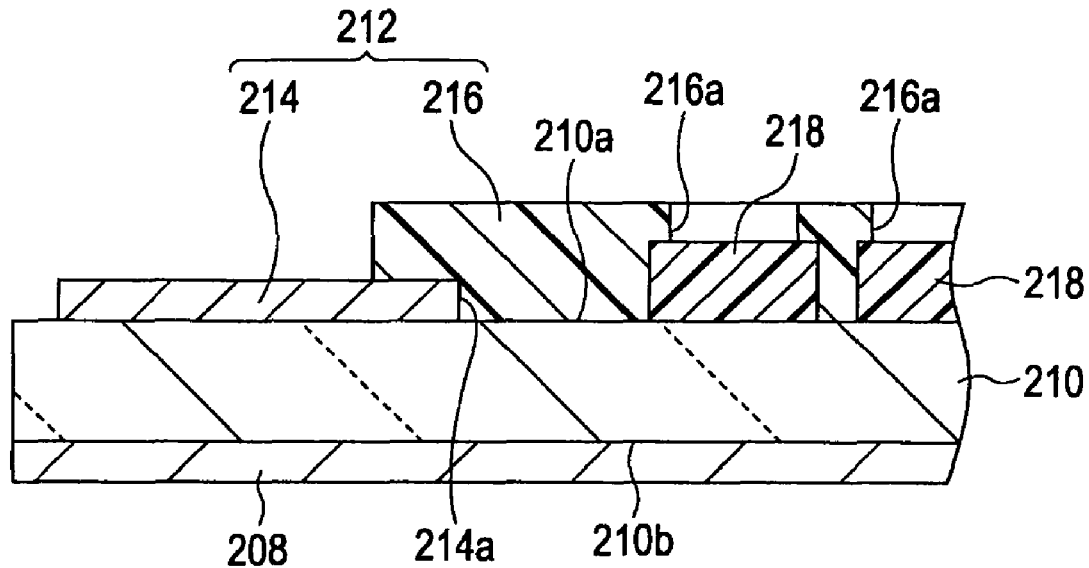
FIG. 13 is a sectional view of a structure in the process for manufacturing the liquid crystal panel.

Step ST6 removes some portions of the second light-shielding film 256, including the portions disposed on the color filters 218, by patterning, as shown in FIG. 13. Thus, the middle portion 216 is formed from the second light-shielding film 256. The patterning may be performed by a variety of methods.

Step ST7 forms an overcoat layer 220 on the color filters 218 and the frame portion 214 and middle portion 216 of the light-shielding film 212 (see FIG. 3). Step ST8 forms an alignment layer 222 on the overcoat layer 220 and rubbed the alignment layer 222 (see FIG. 3).

Figure 14:
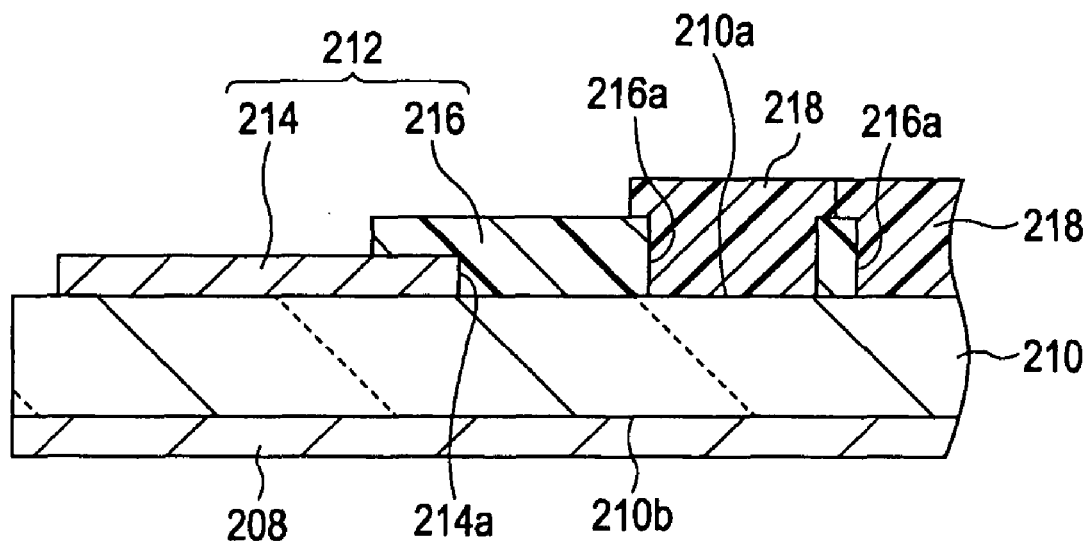
FIG. 14 is a sectional view of a structure in a process for manufacturing a liquid crystal panel according to another embodiment.

Steps ST5 and ST6 for the second light-shielding film 256 may be performed before Step ST4 of forming the color filters 218. In this instance, it is necessary to fill the previously formed holes 216a of the middle portion 216 with the material of the color filters 218, as shown in FIG. 14. It is therefore preferable that the color filters 218 be formed by applying a liquid material. Thus, gaps (or air holes) can be prevented from occurring in the holes 216a. In this method, the material of the color filters 218 is applied so as to cover the previously formed middle portion 216, and consequently the color filters 218 may spread over the middle portion 216, as shown in FIG. 14.

Cleaning may be performed as required.

The resulting second optically transparent substrate 210 including the components 208, 212, 218, 220, and 222 is bonded to an independently formed first optically transparent substrate 110 including the components 112, 114 118, 120, and 122 with a seal 304 (see FIG. 3). A liquid crystal layer 302 is formed between the optically transparent substrates 110 and 210 by, for example, immersion or an ODF (one drop fill) method.

Thus, a liquid crystal panel 90 having the above-described intended effects can be manufactured.

In the above process, the first light-shielding film 254 is formed over the entire first surface 210a of the substrate 210 before forming the optically transparent electroconductive film 208. Consequently, the first light-shielding film 254 can be formed on the first surface 210a under conditions containing few flaws or dust. Thus, a pinhole or the like can be prevented from being formed in the first light-shielding film 254 by a flaw or the like. Consequently, it can be prevented that the pinhole causes light to leak from the middle portion 216 of the light-shielding film 212. Thus, the resulting liquid crystal panel can produce high quality images.

In the above-described process, the optically transparent electroconductive film 208 is formed on the second surface 210b after forming the first light-shielding film 254 (that is, with the first light-shielding film 254 on the first surface 210a). Consequently, the first surface 210a is protected by the first light-shielding film 254 to prevent the first surface 210a from being damaged by, for example, coming into contact with a manufacturing apparatus during the formation of the optically transparent electroconductive film 208. In the above-described process, the first light-shielding film 254 is patterned into a frame after the optically transparent electroconductive film 208 has been formed. Consequently, even if a flaw is formed in or dust is trapped on the first light-shielding film 254 in the pixel region 92, the flaw or the dust can be removed. It is thus prevented that a flaw or the like in the first surface 210a or the first light-shielding film 254 forms a pinhole in the second light-shielding film 256 or the color filters 218. Consequently, it is prevented that the pinhole causes light to leak from the second light-shielding film 254 or the color filters 218. Thus, the resulting liquid crystal panel can produce high quality images.

The above embodiments illustrate FFS type liquid crystal panels in which the electrodes 118 and 120 for driving liquid crystal molecules of the liquid crystal layer 302 are disposed with an insulating layer 114 therebetween. However, the liquid crystal panel may be of an IPS type in which the electrodes 118 and 120 are disposed on the same layer (for example, on the insulating layer 114). In an IPS type, the electrodes 118 and 120 may be patterned into a comb shape and the comb-shaped electrodes are arranged so that the teeth of one comb are each disposed between the teeth of the other comb.

What is claimed is:

1. A liquid crystal panel comprising:
   a first substrate having pixels defining a pixel region;
   pixel electrodes and a common electrode disposed in the pixel region on the first substrate, the pixel electrodes being disposed for the respective pixels;
   a second substrate opposing the first substrate; and
   a light-shielding film disposed on the second substrate, the light-shielding film including a frame portion surrounding the pixel region and a middle portion disposed at least in the pixel region, the middle portion being made of a material having a higher specific resistance than the frame portion, the frame portion being made of a material having a higher light-shielding property than the middle portion.

2. The liquid crystal panel according to claim 1, wherein the frame portion and the second substrate are made of an inorganic material and are in contact with each other.

3. The liquid crystal panel according to claim 1, wherein the frame portion is disposed at least a distance equivalent to one pixel away from the outermost pixels.

4. The liquid crystal panel according to claim 1, wherein the frame portion is made of a material having a higher thermal conductivity than the middle portion.

5. The liquid crystal panel according to claim 1, further comprising an optically transparent electroconductive film on the surface of the second substrate opposite the surface having the light-shielding film.

6. The liquid crystal panel according to claim 1, wherein the pixel electrode and the common electrode are disposed with an insulating layer therebetween, and one electrode disposed above the other has a slit.

7. A projection liquid crystal display apparatus comprising:
    the liquid crystal panel as set forth in claim 1; and
    a light source that irradiates the liquid crystal panel.

* * * * *